United States Patent [19]

Kulischenko

[11] 4,228,760
[45] Oct. 21, 1980

[54] REMOTE CONTROLS FOR MARINE ENGINE EMPLOYING ROTATABLE FLEXIBLE SHAFTS

[75] Inventor: Walter Kulischenko, East Brunswick, N.J.

[73] Assignee: Pennwalt Corporation, Philadelphia, Pa.

[21] Appl. No.: 15,829

[22] Filed: Feb. 28, 1979

[51] Int. Cl.³ .......................... B63H 1/14; B63H 5/06
[52] U.S. Cl. .......................................... 440/86; 74/96; 74/480 B; 440/87
[58] Field of Search ........... 114/144 A; 115/17, 18 R, 115/70, 34 R; 74/96, 216.5, 230.01, 480 B, 491, 496; 64/2 R

[56] References Cited

U.S. PATENT DOCUMENTS

| | | | |
|---|---|---|---|
| 1,890,970 | 12/1932 | Corradino | 114/144 A X |
| 2,703,989 | 3/1955 | Schroeder | 115/17 X |
| 2,739,562 | 3/1956 | Hahs | 115/18 R X |
| 2,957,352 | 10/1960 | Pierce | 74/480 B X |
| 3,111,042 | 11/1963 | Hoover | 115/18 R X |
| 3,136,288 | 6/1964 | Hardy | 115/70 |
| 3,922,995 | 12/1975 | Kroll et al. | 115/18 R |

FOREIGN PATENT DOCUMENTS

| | | | |
|---|---|---|---|
| 2144784 | 3/1973 | Fed. Rep. of Germany | 74/96 |
| 457949 | 5/1914 | France | 115/17 |

*Primary Examiner*—Douglas C. Butler
*Attorney, Agent, or Firm*—Arthur M. Suga; Charles N. Quinn; Edward A. Sager

[57] ABSTRACT

Boat's engine speed and direction of rotation of the engine's propeller shaft are remotely controlled at the helm. Movement of hand control knobs through a semicircular area controls the full range of speed of the engine as well as its forward-neutral-reverse actuator. The knobs rotate a pulley structure which steps up rotation to flexible shafts. The stepped-up rotation of the flexible shafts is converted to linear motion by ball screw cylinders having output members connected to the engine's speed and propeller shaft actuators.

5 Claims, 4 Drawing Figures

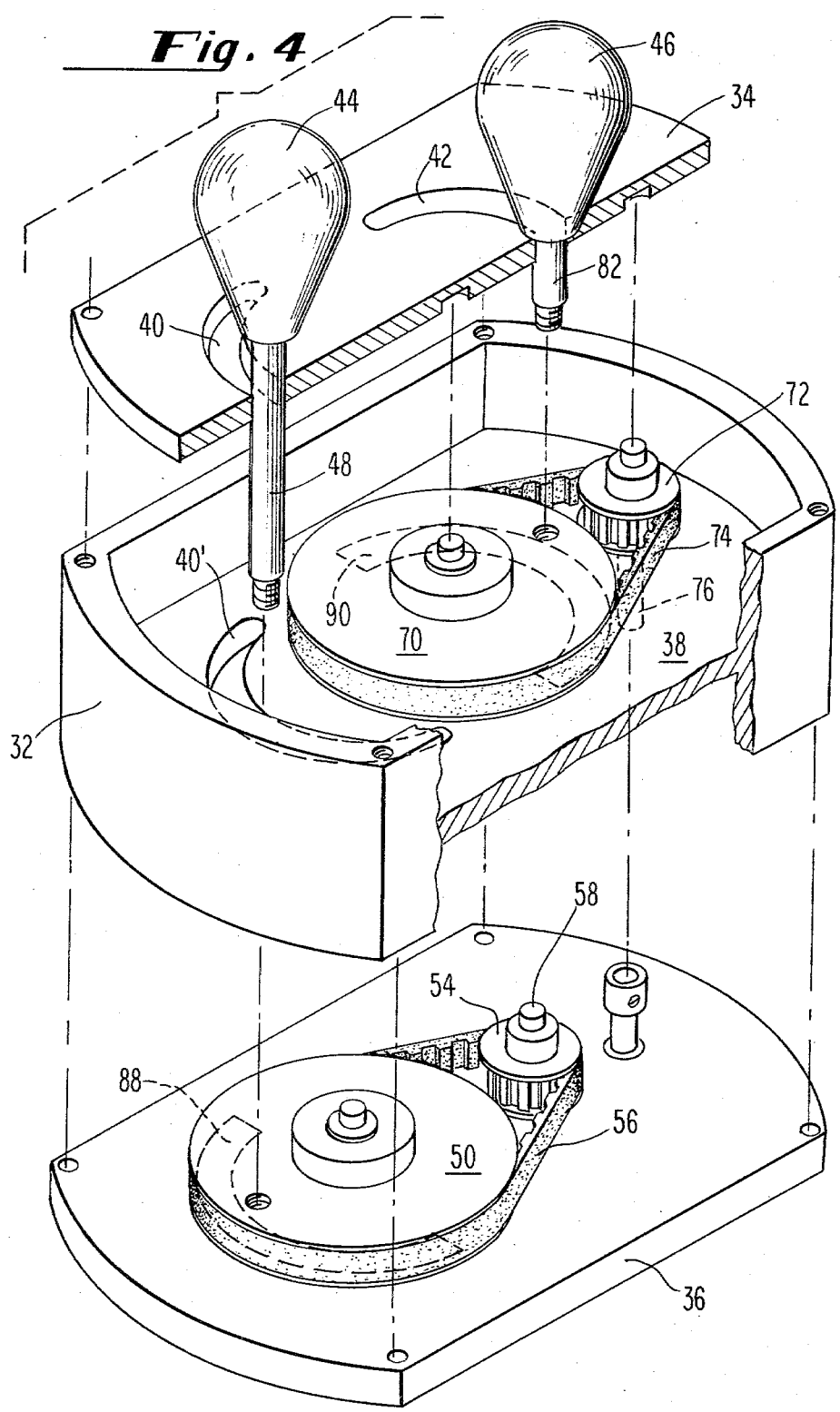

REMOTE CONTROLS FOR MARINE ENGINE EMPLOYING ROTATABLE FLEXIBLE SHAFTS

CROSS-REFERENCE TO OTHER RELATED PATENT APPLICATIONS

Reference is hereby made to copending patent application of Walter Kulischenko for "Remotely Actuated Marine Steering System", Ser. No. 880,410, filed Feb. 23, 1978, and assigned to the present assignee.

STATEMENT OF THE INVENTION

The present invention relates to a marine vessel and more particularly to remote control of its engine speed and direction of travel.

BACKGROUND AND SUMMARY OF THE INVENTION

Most present day remote control systems for marine engines employ push-pull cables to control the throttle actuator which governs the speed of travel of the boat; and the shift actuator, which determines the direction of rotation of the engine propeller shaft, or its neutral position. As is quite well known, push-pull cable systems often require complex installation procedures and are maintained with considerable difficulty.

Other remote control systems for marine engines employ gear mechanisms, linkages, cams, and the like, all of which add to the cost of the systems as well as to their complexity.

The present invention requires no push-pull cables, gear mechanisms, linkage structures or cams, and employs rotatable flexible shafts which rotate in response to rotation of hand-controlled knobs located at the boat's helm. Flexible shaft rotary motion is converted to linear motion for control of the engine's speed and direction of rotation of its propeller shaft.

BRIEF DESCRIPTION OF THE DRAWINGS

FIG. 4 is an exploded perspective view of the remote controls mechanism of FIG. 3.

DETAILED DESCRIPTION OF THE INVENTION

Figure 1:
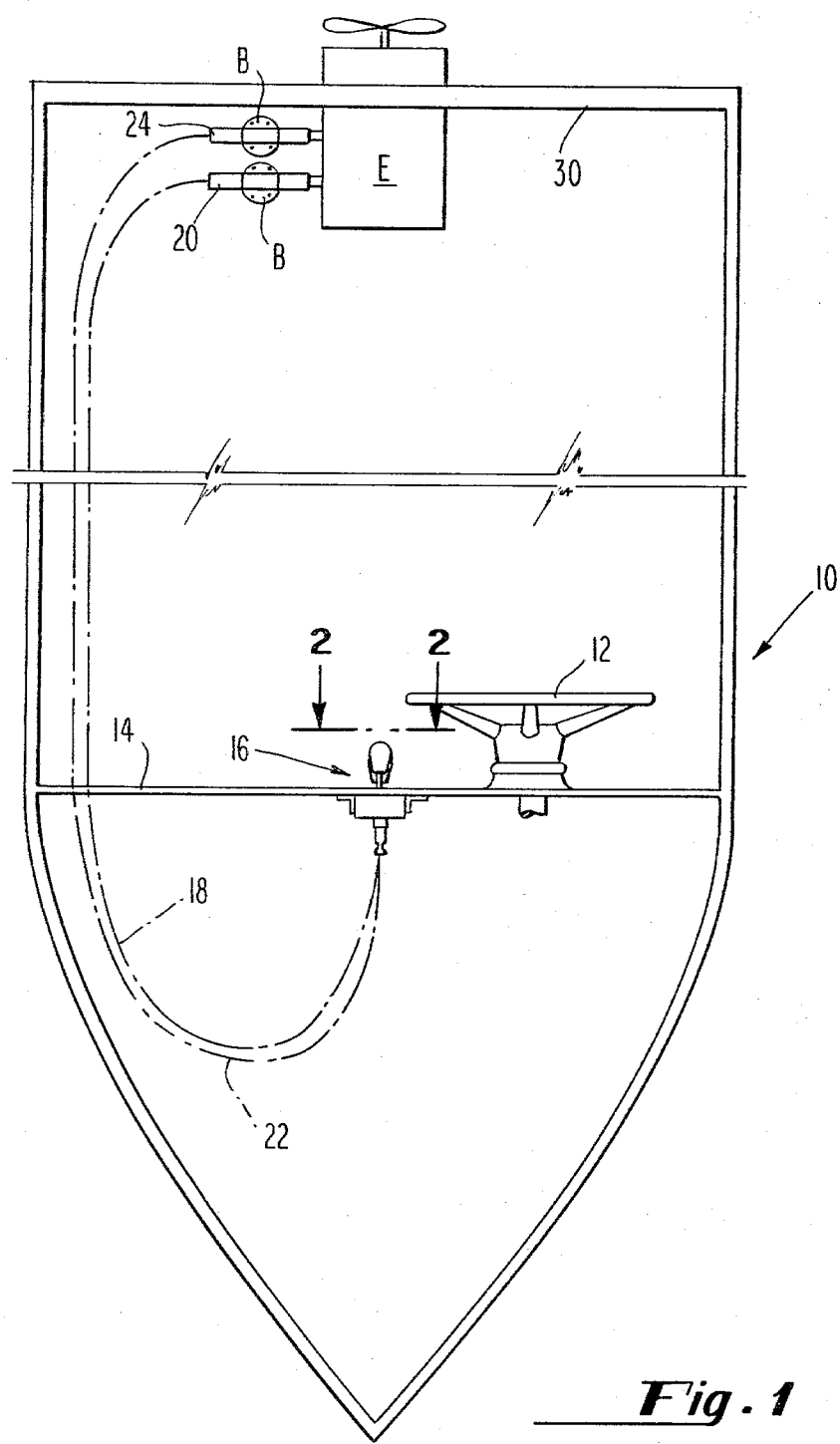
FIG. 1 is a plan view of a boat employing the remote controls of the present invention.

In FIG. 1, a boat 10 employs a manually operable steering wheel 12 for steering the boat by suitable means. At the helm, mounted on dashboard 14 close to steering wheel 12 are the remote controls 16 of the present invention including a rotatable flexible shaft 18 cooperating with ball screw cylinder 20 for controlling the throttle (not shown) on engine E and another rotatable flexible shaft 22 cooperating with another ball screw cylinder 24 for controlling the shift actuator (also not shown) on engine E. Ball screw cylinders 20 and 24 are secured in place by brackets B adjacent transom 30 of boat 10 or secured directly to the housing of engine E. Engine E is mounted conventionally on transom 30.

Figure 2:
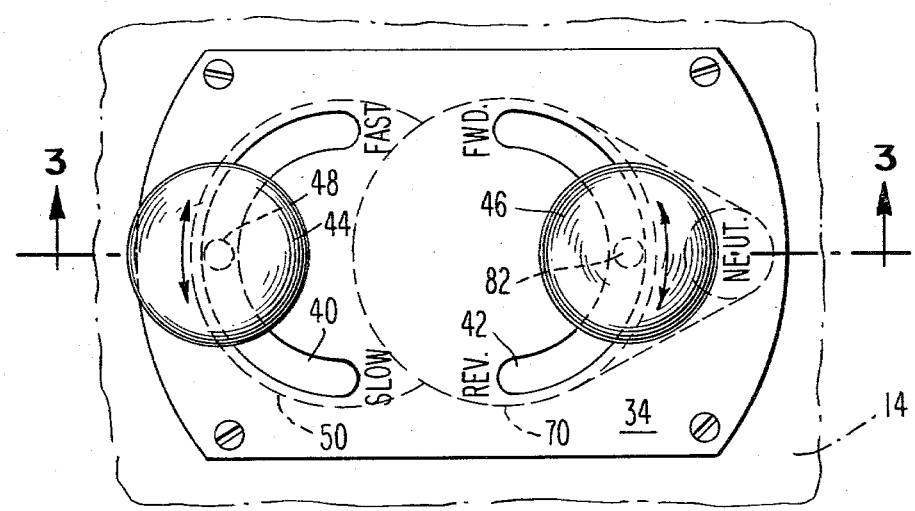
FIG. 2 is an elevational view of the remote controls device of FIG. 1 looking in the direction of the arrows 2—2 thereof, and rotated 90° counterclockwise.
Figure 3:
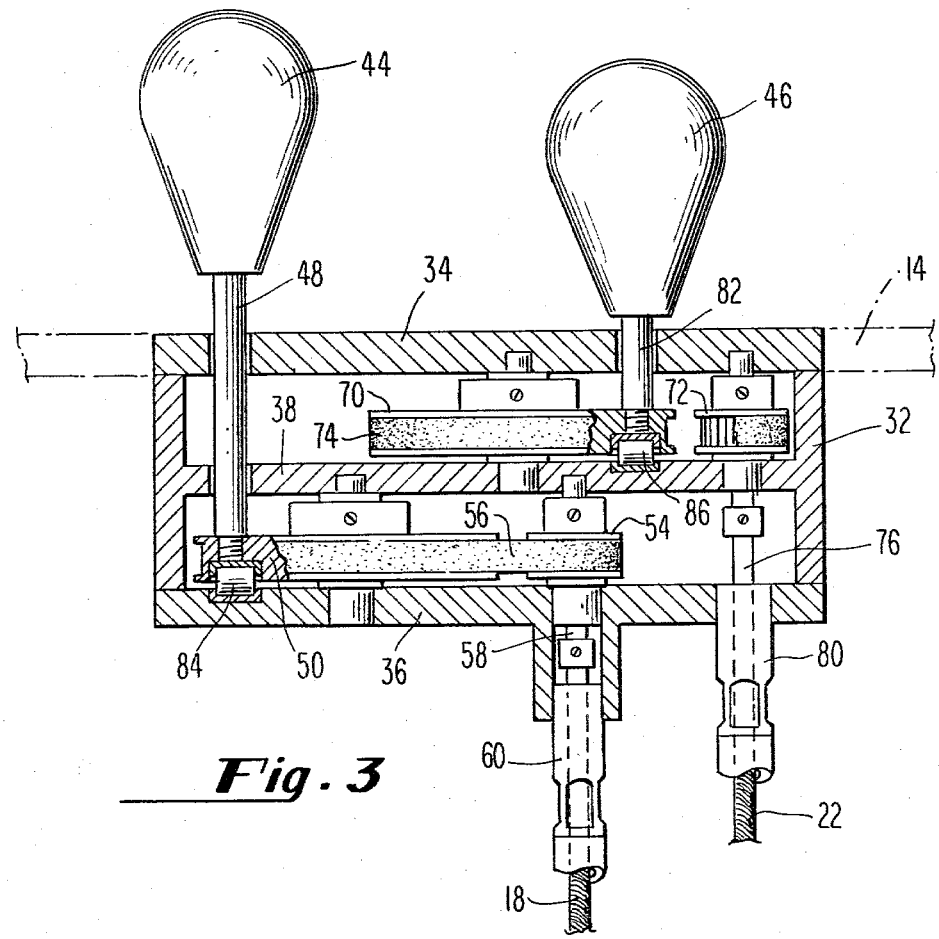
FIG. 3 is a sectional view taken along line 3—3 of FIG. 2.

Referring to FIGS. 2, 3 and 4, remote controls 16 include a housing 32 comprising a control panel plate or front plate 34, rear plate 36 and an intermediate partition member 38 formed preferably integrally with housing 32. Partition member 38 is disposed substantially midway within housing 32 and parallel with plates 34 and 36, which plates are removably secured to housing 32 by screw means.

Front plate 34 is provided with a pair of vertically aligned semi-circular slotted guideways 40 and 42; and partition member 38 is provided with a guideway 40' in optical alignment with guideway 40. Guideways 40 and 40' guide the arcuate movement of control handle or knob 44 which controls the throttle of engine E while guideway 42 guides the movement of knob 46 which controls the shift actuator of engine E.

Throttle control knob 44 is removably connected to throttle control rod 48 which may be moved to any point within guideway 40 by means of control knob 44. Rod 48 is threadedly mounted to an outer portion of a throttle driver pulley 50 rotatably mounted between rear plate 36 and partion member 38. A throttle driven pulley 54 rotates in response to rotation of knob 44 and throttle driver pulley 50 by means of a timing belt 56 engaged between the pulleys. Timing belt 56 is conventional, i.e., spaced indentations thereon are engaged by mating teeth on the pulleys.

In a preferred embodiment, a driver pulley to driven pulley ratio of 6:1 is used. Thus, movement of konb 44 through approximately 180° of rotation will rotate the throttle driver pulley ½ revolution and hence, 3 complete revolutions of throttle driven pulley 54. Other pulley ratios may be employed as desired.

Throttle driven pulley 54 includes shaft 58 whose outer end is connected to flexible shaft 18 by conventional end fitting means 60.

Control of the shift actuator of engine E for controlling forward-reverse direction of travel of boat 10, as well as neutral position of the engine propeller shaft, is effected by structure similar to that aforedescribed. Shift driver pulley 70 and shift driven pulley 72 however are rotatably mounted and supported between partition member 38 and control panel plate or front plate 34. Timing belt 74 cooperatively interengages the pulleys. The outer or output end of shift driven pulley shaft 76 is connected to rotatable flexible shaft 22 by conventional end fitting means 80. An orifice is provided in partition member 38 for passage therethrough of shaft 76. Suitable bearing members may be provided in front plate 34, rear plate 36, and partition member 38 for rotation of the pulley shafts.

A shift control rod 82 has its outer end threadedly mounted to shift driver pulley 70 adjacent a peripheral portion thereof and its inner end removably connected to knob 46. Control rod 82 travels within guideway 42. The ratio of the shift pulleys is identical with that of the throttle pulleys.

To facilitate smooth rotational movement of driver pulleys 50 and 70, suitable bearings, for example, roller thrust bearings 84 and 86 may be provided as illustrated, which roll on corresponding bearing surfaces 88 and 90 provided on rear plate 36 and partition member 38 respectively and also to assert forces exerted on knobs 44 and 46.

The outer ends of rotatable flexible shafts 18 and 22 are connected to ball screw cylinders 20 and 24 respectively for operation of actuators on engine E for control of throttle and shift respectively. The ball screw cylinders are conventional, and typically comprise a nut, a screw which is rotatable relative to the nut, and a plurality of balls disposed in a closed loop around the inner periphery of the nut. The screw, of course, is free to rotate, but linear movement thereof is restrained. The nut however, connected to its respective actuator on engine E is restrained from rotating and thus moves linearly as the screw is rotated.

In a preferred embodiment, three revolutions of either flexible shaft 18 or 22 will cause the nut on either ball screw cylinder 20 or 24 to move linearly 1½ inches, which, in turn, causes the throttle actuator to move from a slow position to a fast position, or vice versa; or the shift actuator to travel from forward to reverse, or vice versa. Movement of the shift control knob 46 midway within guideway 42 will disengage the engine propeller shaft, i.e., the engine will be running in "neutral".

The invention is equally operable whether guideways 40 and 42 are disposed in horizontal or vertical alignment.

The invention is not intended to be limited to the precise structure and details shown and described herein, since obvious modifications, such as the use of a single handle, lever or knob, for example, to control both speed and shift functions would be obvious to one skilled in the art in light of the above teachings.

I claim:

1. In a marine engine having a throttle for controlling speed of said engine and a shift actuator for controlling direction of rotation of propeller shaft of said engine, the combination therewith of the improvement for remotely controlling said throttle and shift actuator from the helm of a marine vessel by application of opposed manipulatively distinguishable arcuate motions to respective controls for said throttle and shift actuator, comprising a throttle control knob and a shift actuator control knob supported for individual opposed arcuate co-planar movement at said helm, a driver pulley associated with each of said knobs and turned at its periphery by its associated control knob upon arcuate movement thereof, a driven pulley rotating in stepped-up response to rotation of each of said driver pulleys, a housing including a control panel front plate having opposed arcuate guideway slots therethrough defining range of movement of respective knobs and an interior partition having an arcuate guideway slot optically aligned with one of said front plate guideway slots, said partition dividing said housing into two compartments, a driver-driven pulley pair in each compartment, mounted at said helm for rotatably mounting said driver pulleys and said driven pulleys, control rods connecting the peripheries of respective driver pulleys with respective control knobs, one rod passing through said optically aligned guideway slots in said front plate and said partition and a second rod passing through said remaining guideway slot in said front plate, respective control rods being movable transversely to said front plate within their respective slots unitarily with respective control knobs in response to operator applied movement thereof, thrust bearing means separating respective driver pulleys from said interior partition and a rear panel of said housing, a rotatable flexible shaft connected co-axially to each of said driven pulleys for unitary rotation therewith, and means converting rotary motion of each of said flexible shafts into linear motion for control of said throttle and shift actuator.

2. The improvement for remotely controlling said throttle and said shift actuator of claim 1 comprising
   a timing belt interengaging each of said drive pulleys with each of said driven pulleys.

3. The improvement of claim 2 wherein said slotted guideways are semi-circular to thereby provide a maximum rotation to said driver pulleys of approximately 180°.

4. The improvement of claim 3 wherein the ratio of driver pulleys to driven pulleys is 6:1.

5. The improvement of claim 4 wherein said means converting rotary motion of said flexible shafts into linear motion are ball screw cylinders, each of said ball screw cylinders having an output member for effecting full range of motion of said throttle and shift actuator upon receiving 3 complete revolutions of said flexible shafts.

* * * * *